(12) United States Patent
Zhang, Jr. et al.

(10) Patent No.: US 11,352,869 B2
(45) Date of Patent: Jun. 7, 2022

(54) METHOD AND SYSTEM FOR ANALYZING A DRILL STRING STUCK PIPE EVENT

(71) Applicant: LANDMARK GRAPHICS CORPORATION, Houston, TX (US)

(72) Inventors: Feifei Zhang, Jr., Spring, TX (US); Dale E. Jamison, Humble, TX (US); Yi Pan, The Woodlands, TX (US)

(73) Assignee: Landmark Graphics Corporation, Houston, TX (US)

( * ) Notice: Subject to any disclaimer, the term of this patent is extended or adjusted under 35 U.S.C. 154(b) by 71 days.

(21) Appl. No.: 16/609,495

(22) PCT Filed: Aug. 18, 2017

(86) PCT No.: PCT/US2017/047663
§ 371 (c)(1),
(2) Date: Oct. 30, 2019

(87) PCT Pub. No.: WO2019/035848
PCT Pub. Date: Feb. 21, 2019

(65) Prior Publication Data
US 2020/0173268 A1    Jun. 4, 2020

(51) Int. Cl.
*E21B 44/00* (2006.01)
*E21B 21/08* (2006.01)
(Continued)

(52) U.S. Cl.
CPC .............. *E21B 44/00* (2013.01); *E21B 21/08* (2013.01); *E21B 31/00* (2013.01); *E21B 47/00* (2013.01);
(Continued)

(58) Field of Classification Search
CPC .......... E21B 44/00; E21B 21/08; E21B 31/00; E21B 47/00; E21B 21/01; E21B 47/06;
(Continued)

(56) References Cited

U.S. PATENT DOCUMENTS 3,765,487 A    10/1973  McEver
5,327,984 A    7/1994   Rasi et al.
(Continued)

FOREIGN PATENT DOCUMENTS

CA           2181790 C       4/2000
WO    WO 2017/027105 A1      2/2017

OTHER PUBLICATIONS

Liangjun Xie, et al. "Sophisticated Software Analysis System and Use of Torque/Drag Modeling for Complex Well Operations Increases Operational Efficiency," IADC/SPE Drilling Conference and Exhibition pp. 1-13 (Year: 2012).*
(Continued)

*Primary Examiner* — Steven W Crabb
(74) *Attorney, Agent, or Firm* — Haynes and Boone, LLP (57) ABSTRACT

A method includes receiving a plurality of drilling parameters from a drilling operation, wherein the plurality of drilling parameters. The drilling parameters include a cuttings bed height and a friction factor between a drill string and a wellbore. The method further includes applying the plurality of drilling parameters to a friction model. The friction model utilizes a function of the cuttings bed height to determine a comprehensive friction factor. The comprehensive friction factor is applied to the plurality of drilling parameters to determine a required torque or hook load of the drill string. The method further includes providing an indication of a stuck pipe event.

20 Claims, 5 Drawing Sheets

(51) Int. Cl.
| | |
|---|---|
| *E21B 31/00* | (2006.01) |
| *E21B 47/00* | (2012.01) |
| *G06N 7/06* | (2006.01) |
| *G06F 30/28* | (2020.01) |
| *G06F 30/20* | (2020.01) |
| *G05B 13/04* | (2006.01) |
| *G06F 111/10* | (2020.01) |

(52) U.S. Cl.
CPC ............. *G05B 13/04* (2013.01); *G06F 30/20* (2020.01); *G06F 30/28* (2020.01); *G06N 7/06* (2013.01); *G05B 2219/45148* (2013.01); *G05B 2219/45208* (2013.01); *G06F 2111/10* (2020.01)

(58) Field of Classification Search
CPC ...... E21B 44/04; E21B 21/082; E21B 21/085; E21B 31/08; E21B 47/006; E21B 21/019; G05B 13/04; G05B 2219/45208; G05B 2219/45148; G06F 30/20; G06F 30/28; G06F 2111/10; G06F 30/25; G06F 30/27; G06F 2119/22; G06N 7/06
See application file for complete search history.

(56) References Cited

U.S. PATENT DOCUMENTS

| | | |
|---|---|---|
| 5,375,476 A | 12/1994 | Gray |
| 8,181,510 B2 | 5/2012 | Aldred et al. |
| 2011/0069583 A1 | 3/2011 | Camwell et al. |
| 2014/0110167 A1 | 4/2014 | Goebel et al. |
| 2015/0218914 A1* | 8/2015 | Marx .................. E21B 41/0092 175/24 |

OTHER PUBLICATIONS

International Search Report and The Written Opinion of the International Search Authority, or the Declaration, dated May 29, 2018, PCT/US2017/047663, 15 pages, ISA/KR.

* cited by examiner

METHOD AND SYSTEM FOR ANALYZING A DRILL STRING STUCK PIPE EVENT

PRIORITY

The present application is a U.S. National Stage patent application of International Patent Application No. PCT/US2017/047663, filed on Aug. 18, 2017, the benefit of which is claimed and the disclosure of which is incorporated herein by reference in its entirety.

TECHNICAL FIELD

The present description relates in general to methods and systems for analysis of the occurrence of a drill string becoming stuck in the wellbore (i.e., a stuck pipe event) in a drilling operation and more particularly to, for example, without limitation, to methods and systems for analyzing the occurrence of a drill string becoming stuck in the wellbore while considering drilled cuttings in the wellbore.

BACKGROUND OF THE DISCLOSURE

Once a prospective reservoir of oil or natural gas in a subterranean formation has been located a drilling rig is set up to drill a wellbore penetrating the subterranean formation. The drilling rig includes power systems, mechanical motors, a rotary turntable drill, and a circulation system that circulates drilling fluid, sometimes called "mud," throughout the wellbore. The fluid serves to remove materials, sometimes called "cuttings," as the drill bit loosens them from the surrounding rock during drilling and to maintain adequate wellbore pressure.

At least some drilling operations involve rotating a drill bit at the distal end of the pipe, sometimes called "drill string," and transmitting rotary motion to the drill bit using a multi-sided pipe known as a "kelly" with a turntable. In other drilling operations, the drill bit is rotated with a motor near the drill bit such that the drill string does not rotate. In both cases, as drilling progresses, drilling fluid circulates through the pipe and out of the drill bit into the wellbore.

In drilling wellbores for hydrocarbon extraction, on occasion the drill string (e.g., drill bit, drill collars, and drill string) used to create the wellbore may become stuck in the wellbore during a drilling operation.

BRIEF DESCRIPTION OF THE DRAWINGS

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure is related to methods and systems for analyzing of the occurrence of a drill string becoming stuck in the wellbore (i.e., a stuck pipe event) in a drilling operation and more particularly to, for example, without limitation, to methods and systems for analyzing of the occurrence of a drill string becoming stuck in the wellbore while considering drilled cuttings in the wellbore.

Drilling operations are extremely expensive and time consuming. For example, drilling operations at an offshore rig can cost in excess of $500,000 to $1,000,000 per day. During drilling, a stuck drill string can cost the drilling company money and time. The cost may be associated with time to dislodge the drill string, the cost may be associated with a "fishing" operation if the drill string is broken off, or the cost may also be associated with lost equipment if the drill string cannot be dislodged and/or retrieved. Therefore, predicting and therefore mitigating stuck pipe events, can lead to huge monetary savings.

Nearly one third of the drilling time lost is caused by stuck pipe incidents and about half of these incidents are related to insufficient hole cleaning during drilling or cuttings accumulating behind large diameters tool joints during tripping. In many cases, these incidents are preventable if early signs are detected and timely measures are taken, especially if the stuck pipe event is caused by solid agglomerations (mainly drilled cuttings) in the wellbore.

According to at least some embodiments disclosed herein is the realization that stuck pipe events can be avoided if the accumulation of cuttings is modelled. Further, according to at least some embodiments disclosed herein is the realization that stuck pipe events can be avoided if the accumulation of cuttings around tool joints is modeled. Further, according to at least some embodiments disclosed herein is the realization that a maximum plug length can be determined that allows for desired operation while minimizing non-productive time.

Figure 1:
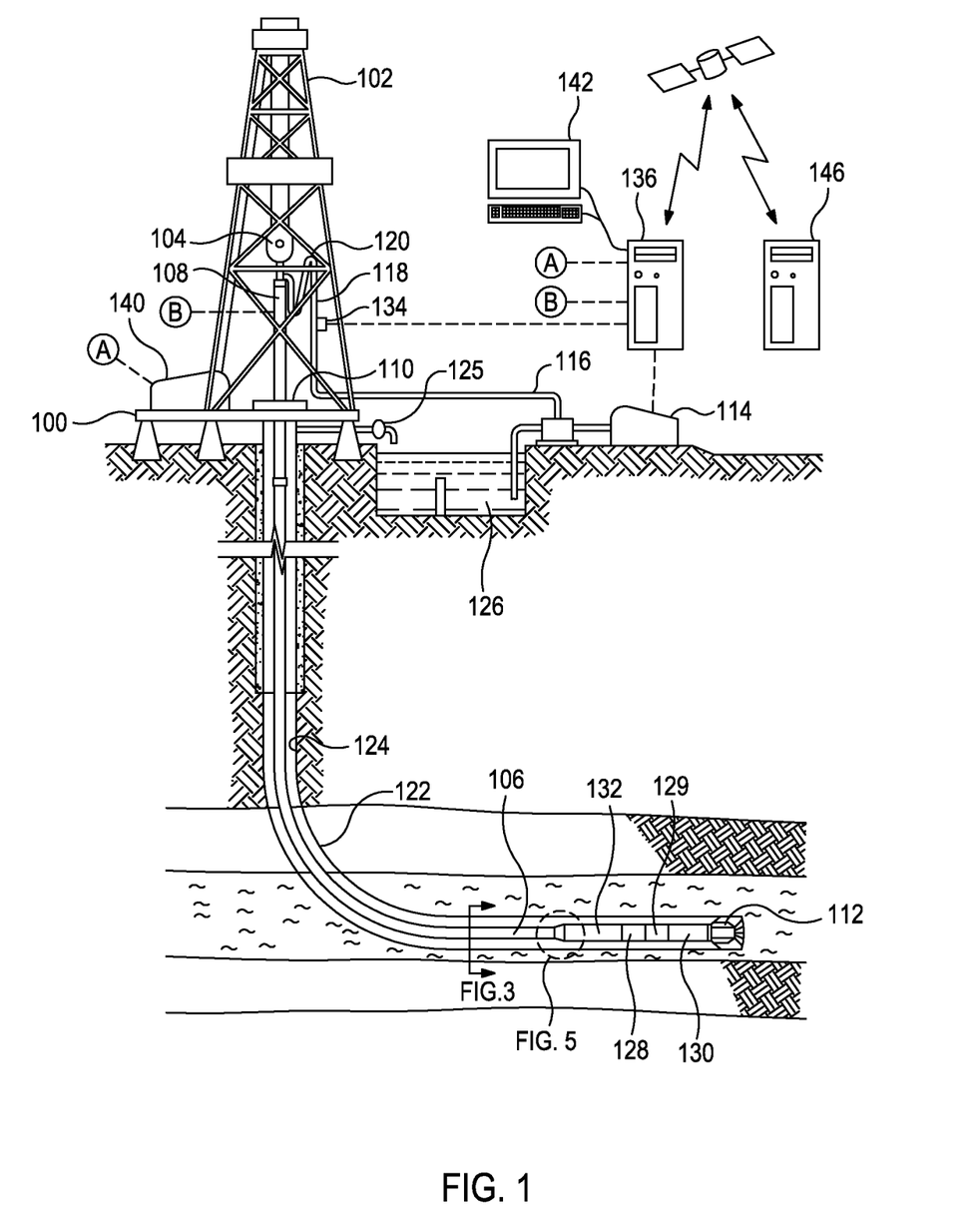
FIG. 1 is an elevation view of an exemplary well system, according to some embodiments of the present disclosure.

FIG. 1 is an elevation view of an exemplary drilling platform 100 that may incorporate the principles of the present disclosure. In particular. FIG. 1 shows a drilling platform 100 equipped with a derrick 102 that supports a hoist 104. Drilling in example situations is carried out by a string of drill pipes connected together by "tool" joints to form a drill string 106. The hoist 104 suspends a top drive 108 that is used to rotate the drill string 106 and to lower the drill string through the wellhead 110. Connected to the lower end of the drill string 106 is a drill bit 112. Drilling is accomplished by rotating the drill bit 112. Rotation of the drill bit 112 may be by rotating drill string 106 by way of the top drive 108, by use of a downhole "mud" motor near the drill bit 112 that turns the drill bit 112, or by both methods. Drilling fluid is pumped by mud pump 114 through flow line 116, stand pipe 118, goose neck 120, top drive 108, and down through the drill string 106 at high pressures and volumes to emerge through nozzles or jets in the drill bit 112. The drilling fluid then travels back up the wellbore via the annulus 122 formed between the exterior of the drill string 106 and the wellbore wall 124, through a blowout preventer (not specifically shown), over a shale shaker 125 and into a mud pit 126 on the surface. On the surface, the drilling fluid is cleaned by the shale shaker 125 and then circulated again by mud pump 114. The drilling fluid is used to cool the drill bit 112, to carry cuttings from the base of the wellbore to the surface, and to balance the hydrostatic pressure in the rock formations.

In accordance with the some embodiments, the drill string 106 may comprise a logging-while-drilling ("LWD") tool 128, a pressure-while-drilling tool (PWD) 129 and a measuring-while-drilling ("MWD") tool 130. The distinction between LWD, PWD and MWD is sometimes blurred in the industry, but for purposes of this specification and claims, LWD tools measure properties of the surrounding formation (e.g., porosity, permeability, natural gamma radiation), PWD tools measures the pressure at the bottom of the well, and MWD tools measure properties associated with the wellbore (e.g., inclination, direction, weight-on-bit, drill bit revolutions-per-minute ("RPM")). The tools 128 and 130 may be coupled to a telemetry module 132 that transmits data to the surface. In some embodiments, the telemetry module 132 sends data to the surface electromagnetically. In other cases, the telemetry module 132 sends data to the surface by way of electrical or optical conductors embedded in the pipes that make up the drill string 106. In yet still other cases, the telemetry module 132 modulates a resistance to drilling fluid flow within the drill string to generate pressure pulses that propagate at the speed of sound of the drilling fluid to the surface.

Still referring to FIG. 1, in the illustrative case of data encoded in pressure pulses that propagate to the surface, one or more transducers, such as transducers 134 convert the pressure signal into electrical signals. The electrical signals are coupled (e.g., after being digitized by digital-to-analog converter) to a computer system 136 or some other form of a data processing device located near the drilling site. Computer system 136 operates in accordance with software (which may be stored on a computer-readable storage medium) to process and decode the received signals. The data sent from the downhole devices to the surface may be useful in analyzing stuck pipe events, as discussed more thoroughly below.

The example computer system 136 may receive data from, transmit data to, and/or control, manually or automatically, one or more operations of one or more of various types of surface-based equipment. The example communicative couplings are shown in dashed lines in FIG. 1 so as not to unduly complicate the drawings. For example, the computer system 136 may communicatively couple to the mud pump 114. Thus, the computer system 136 may be able to read and/or control, manually or automatically, various parameters associated with the mud pump, such as mud pump operational speed, and outlet pressure. Further, the computer system 136 may communicatively couple to the winch system 140 that controls the hoist 104. From the communicative coupling the computer system 136 may be able to read and/or control, manually or automatically, various parameters associated with the hoist, such as hook load (which may be indicative of weight-on-bit). Further, the computer system may communicatively couple to sensors associated with the top drive 108. From the communicative coupling to the sensors associated with the top drive 108, the computer system 136 may be able to read and/or control, manually or automatically, various parameters such as RPM of the drill string 106 (at the surface), and torque applied to the drill string by the top drive 108.

So as not to unduly complicate the drawing, additional communicative couplings between the computer system 136 and the various drilling system components are omitted. However, various other communicative couplings can be performed using the system. For example, a non-limiting list of surface-based parameters that may be directly or indirectly read by the computer systems 136 includes parameters such as: hook load; RPM of the drill string at the surface; torque applied to the drill string at the surface; pressure of the drilling fluid as the drilling fluid is pumped into the drill string; pressure of the drilling fluid returning to the surface; and/or standpipe pressure of the drilling fluid. Moreover, by way of the communicative coupling to the devices within the wellbore, other parameters that may be read comprise: weight-on-bit as measured by a MWD tool; RPM of the drill bit; torque downhole (e.g., provided by the mud motor); and/or inclination of the wellbore as measured by the MWD tool. Further, parameters associated with the formation proximate the drill bit may be read, such as: formation porosity as measured by an LWD tool; formation permeability as measured by an LWD tool; formation response to neutron irradiation (the response derived from returning neutrons, or from gammas created by neutron interaction) by a LWD tool; and/or natural gamma production by the formation as measured by the LWD tool.

Still referring to FIG. 1, the computer system 136 may receive data from a drilling operator by way of an interface device 142. For example, the drilling operator may provide information such as wellbore diameter, drill pipe diameter, drill pipe wall thickness, the number of drill pipes in the drill string, drill bit type (e.g., roller cone, fixed cutter bit), drilling fluid parameters (e.g., viscosity, specific gravity). Other parameters, both static and dynamic, may be received by the computer system 136.

Before proceeding, it is noted that while FIG. 1 illustratively shows an example land-based drilling operation, some embodiments can include subsea drilling operation from a platform or other drilling vessels, and similar sets of drilling parameters may be collected in the subsea drilling situations.

The measured and collected drilling parameters may be stored in a database in the computer system 136. In some embodiments, the computer system 136 may gather drilling parameters, and then forward the data to another computer system 146, such as a computer system at the home office of the oilfield services provider. The communication of data, for purposes of reading, collecting, or analyzing one or more drilling parameters or controlling one or more drilling parameters via a component of the drilling operation, between computer system 136 and computer system 146 may take any suitable form, such as over the internet, by way of a local or wide area network, or as illustrated over a satellite link. The specification now turns to a brief description of stuck pipe events.

Stuck pipe events are events in which the drill string 106 (and associated downhole equipment) becomes lodged in the wellbore. The stuck pipe event may manifest itself as an inability to rotate the drill string from the surface, an inability to raise and/or lower the drill sting by way of the hoist 104, or both. There are many physical reasons for a stuck pipe event, including, but not limited to: a cave-in of the wellbore above the drill bit; drill-cuttings not properly carried away and thus settling within the wellbore; turning radius issues in deviated wellbores; adhesion of the drill string based on a lack of movement; high friction between the drill pipe and the wellbore walls; and/or differential sticking caused by higher drilling fluid pressure than formation pressure.

In accordance with some embodiments disclosed herein, methods and systems are provided to assist drilling operators in avoiding stuck pipe events by providing an analysis of a stuck pipe event either sufficiently far in advance that one or more corrective measures may be taken. Further, in some embodiments, drilling operations can be modeled or simulated to avoid stuck pipe conditions. Some embodiments described herein can model the effect of accumulated cuttings on stuck pipe events.

Figure 2:
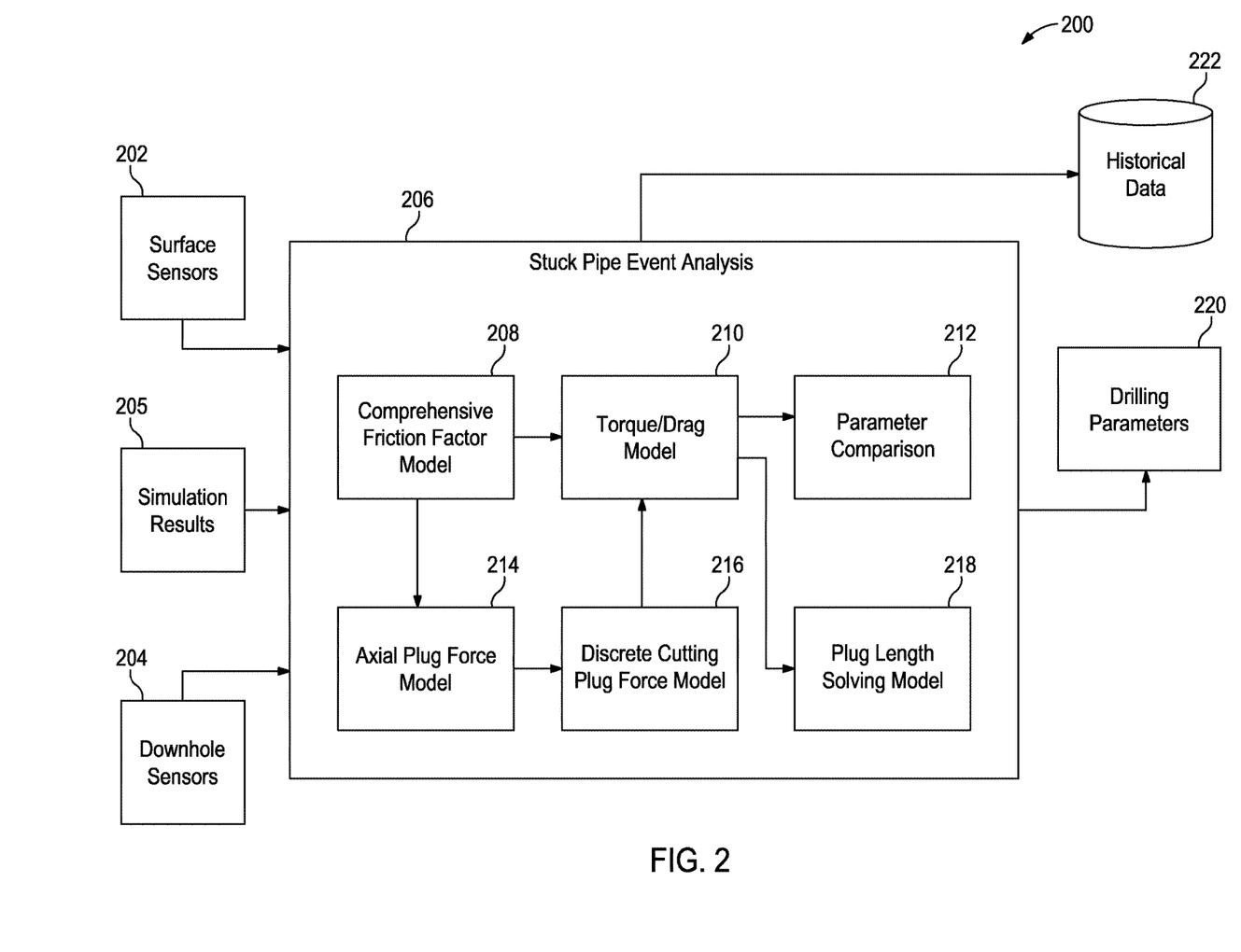
FIG. 2 is a system diagram of an analysis system, according to some embodiments of the present disclosure.

FIG. 2 is a block diagram of an example system to analyze stuck pipe events. The system 200 can comprise surface sensors 202 and downhole sensors 204. As discussed with respect to FIG. 1, example surface sensors 202 may include pressure sensors, torque meters, RPM meters, and/or strain meters (e.g., hook load sensor). Likewise as discussed with respect to FIG. 1, example downhole sensors may include LWD tools and/or MWD tools and/or PWD tools telemetering various values to the surface. The surface sensors 202 and downhole sensors 204 can be used to measure and collect data representative of one or more drilling parameters (hereafter just "drilling parameters").

Referring to block diagram of FIG. 2, in some embodiments of the system 200, a drilling parameter from the surface sensors 202 and/or downhole sensors 204 may be received by the stuck pipe event analysis 206. In some cases, the stuck pipe event analysis 206 may be executed, in whole or in part on computer system 136. In other cases, the stuck pipe event analysis 206 may be executed on remote computer system 146. In yet still other cases, various aspects of the stuck pipe event analysis may be divided between the example computer systems 136 and 146.

According to some embodiments of the system 200, simulation results 205 from previously or concurrently conducted simulations may be received by the stuck pipe event analysis 206. Simulation results 205 can provide additional information or parameters that can be used by the stuck pipe event analysis 206. For example, information regarding the distribution of cuttings buildup within the wellbore, as described in U.S. Pat. No. 9,567,836, can be provided to the stuck pipe event analysis 206.

The system 200 can utilize real-time data to provide real-time analysis of past, predicted, and current stuck pipe events, and/or to control, manually or automatically, one or more components of the drilling operation. Examples of real-time data to be collected may include, but are not limited to, flow rate of the drilling fluid, viscosity of the drilling fluid, density (or weight) of the drilling fluid, revolutions per minute of the drill bit, rate of penetration into the subterranean formation, torque applied to the drill string, trajectory of the drill bit, weight on bit (e.g., for calculating characteristics of the cuttings produced during drilling), measured depth, true vertical depth, formation composition (e.g., for calculating wellbore stresses and time-dependent fracture gradients), temperature and pressure (e.g., for calculating fluid viscosity changes, expansion and contraction of fluids), and the like, and any combination thereof. As used herein, the term "measured depth" refers to the length of the wellbore, which depending on the trajectory of the wellbore may be equal to or greater than the true vertical depth. As used herein, the term "true vertical depth" may refer to the depth of the wellbore measured in a straight line perpendicular to the surface.

Calculating the effect of forces on the drill string, particularly forces due to the accumulation and packing of cuttings, may be achieved with multiple models, including a comprehensive friction factor model 208, a torque and drag model 210, a discrete cuttings plug force model 216, and a plug length solving model 218.

To determine the effects of cuttings on the drill string, the comprehensive friction factor, which can consider the frictional effects of the cuttings, can be utilized. In some embodiments, the comprehensive friction factor model 208 can utilize the following function as a friction model to determine a friction factor that considers the frictional effects of accumulated cuttings:

$$f_s = F\left(f, \frac{h_{bed}}{D_w}, \theta, \frac{D_p}{D_w}\right),$$

wherein the comprehensive friction factor function can be a function of $f$, the original friction factor between the drill string and the wellbore, the height of the cuttings bed, $h_{bed}$, the wellbore diameter, $D_w$, the inclination angle, $\theta$, and the drill string diameter, $D_p$. In some embodiments, the height of the cuttings bed can be normalized by the wellbore diameter. In some embodiments, the drill string diameter similarly can be normalized by the wellbore diameter.

In some embodiments, the height of the cuttings bed can be indicative of the accumulation of the cuttings, and can serve as an approximation of the accumulation of the cuttings. In some embodiments, other characteristics of the cuttings can be considered in the modeling of the comprehensive friction factor, including the volume fraction of the cuttings, as well as chemical properties of the cuttings, such as the lubricity of the cuttings. In some embodiments, the comprehensive friction factor function can be determined from experimental or historical data 222 or other established or observed relationships.

In some embodiments, the comprehensive friction factor can be modeled to determine the effect of accumulated cuttings on the torque and/or drag on the drill string within the wellbore. During drilling of oil and gas wells, especially deviated or horizontal wells, the drilled cuttings can pack in the wellbore which increases the torque and drag on the drill string significantly.

Figure 3:
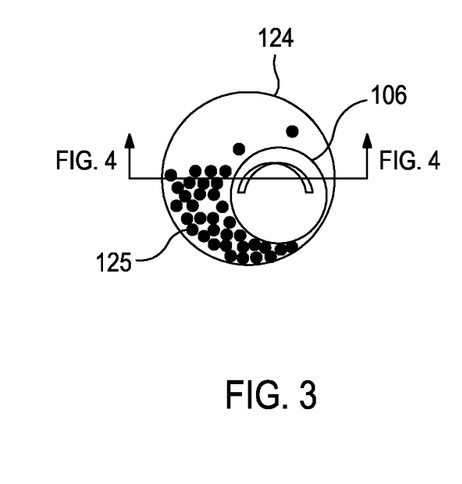
FIG. 3 is a cross sectional view of a drill string taken along section line 3-3 of FIG. 1, according to some embodiments of the present disclosure.

FIG. 3 illustrates a cross-sectional view of a drill string within a wellbore, taken along section line 3-3 of FIG. 1. Referring to FIG. 3, the accumulation and packing of cuttings 125 can increase the torque required for the rotation of the drill string 106 within the wellbore 124. During operation, the rotation of the drill string 106 can move and accumulate the packed cuttings 125, which increases the load and the required torque on the drill string 106. Further, the surface of the packed cuttings 125 can be coarser than the surface of the wellbore 124, which increases the friction force on the drill string 106 compared to the drill string 106 free of cuttings 125.

Figure 4:
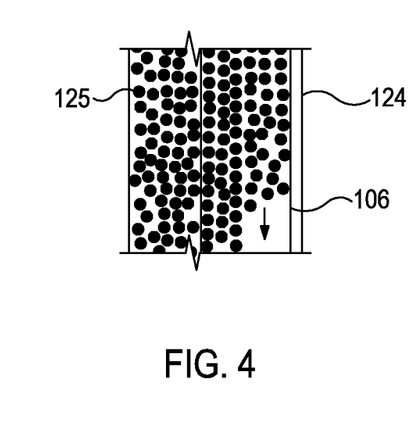
FIG. 4 is a cross sectional view of a drill string taken along section line 4-4 of FIG. 1, according to some embodiments of the present disclosure.

FIG. 4 illustrates a cross-sectional view of a drill string within a wellbore, taken along section line 4-4 of FIG. 3. Referring to FIG. 4, the accumulation and packing of cuttings 125 can increase the drag force required for the tripping (axial movement) of the drill string 106 within the wellbore 124. During operation, the surface of the packed cuttings 125 can be coarser than the surface of the wellbore 124, which increases the friction force of the drill string 106 compared to the drill string 106 free of cuttings 125. Further, during operation, the drill string 106 can be become buried in the cuttings 125, which increases the axial load on the drill string 106 compared to an unburied drill string 106.

The comprehensive friction factor can be modeled from the wellbore, drill string, and cuttings parameters from the area of interest, such as the portions of the drill string shown in FIGS. 3 and 4. The comprehensive friction factor from the comprehensive friction factor model 208 can be utilized by the torque/drag model 210 to determine a required rotational torque and a hook load required to rotate and/or trip the drill string 106, considering the effects of the cuttings 106. The torque/drag model 210 can apply the comprehensive friction factor to a known or measured contact force to determine the resulting torque and drag upon the drill string 106.

After a required torque and/or drag is modeled using the comprehensive friction factor, the resulting required torque and hook load can be compared to known, historical, or experimental values or limits, including maximums and operating limits in the parameter comparison block 212. In some embodiments, an indication of a current, previous, or forecasted stuck pipe event can be provided. In some embodiments, drilling parameters can be changed in response to the comparison block 212 as described herein.

In addition to the torque and drag attributed to the cuttings within the wellbore, cuttings can accumulate at tool joints of the drill string, adding significant hook load, which can increase the likelihood of a stuck pipe event.

Figure 5A:
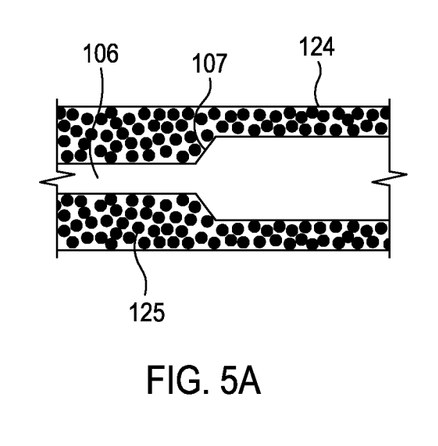
FIGS. 5A and 5B are detail views of a drill string from FIG. 1, according to some embodiments of the present disclosure.

FIG. 5A illustrates a tool joint within the drill string within the wellbore. Referring to FIG. 5A, a tool joint 107 is shown as an area of the drill string 106 with an increased diameter relative to the diameter of the drill string 106. For example, in the drill string 106 there are a number of components that may have diameters larger than the most parts of the drill string 106, such as the BHA, stabilizers, and connectors between drill pipes. Cuttings 125 can accumulate at these tool joints 107 and create additional axial forces, thus increase the drag force on the drill string 106.

To include the effect of the accumulated cuttings in hook load calculations, an additional force term $F_p$ can be added to the calculated hook load. $F_p$, the axial plug force of the accumulated cuttings 125 can be modeled by:

$$F_p = F_r + F_{fw} + F_{fp},$$

wherein the total force of the $F_p$ can be modeled by the sum of (1) an axial force or hook load of the drill string $F_r$, (2) a frictional force of the accumulated cuttings against the wellbore 124, including friction from cuttings, $F_{fw}$, and (3) a frictional force of the drill string 107 against the wellbore 124, $F_{fp}$. In some embodiments, the axial force $F_r$ and the frictional force of the tool joint $F_{fp}$, can be measured, calculated, known, or approximated from historical data 222.

Figure 5B:
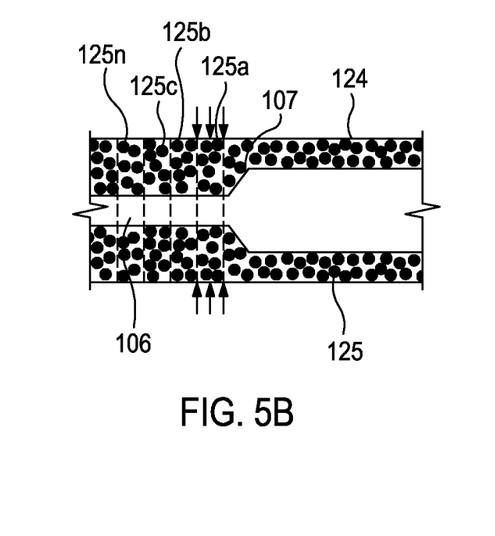

$F_{fw}$, the frictional force of the accumulated cuttings 125 against the wellbore 124, can be modeled by:

$$F_{fw} = \int_0^{2\pi} F_{cw} \cdot f_{ws} d\theta$$

wherein the total frictional force of the accumulated cuttings, $F_{fw}$ can be related to a friction factor $f_{ws}$ applied to a radial force of the accumulated cuttings 125, $F_{cw}$. $F_{cw}$ can also be referred to as a cuttings plug contact force. For modelling purposes, the accumulated cuttings 125 can be divided into discrete segments to determine discrete cuttings plug contact forces within each segment. FIG. 5B illustrates a tool joint within the drill string within the wellbore. Referring to FIG. 5B the accumulated cuttings 125 are divided into segments or sub-elements 125a-125n. The friction factor $f_{ws}$ can be applied to a radial force $F_{cw}$ for each segment or sub element and integrated to determine a total cuttings plug contact force $F_{fw}$.

In some embodiments, the discrete cutting plug contact force, or radial force $F_{cw}$ of each sub element can be related to the axial force $F_r$. In some embodiments, the axial plug force model 214 can utilize a Bridgman seal approximation to relate the axial force $F_r$ to the radial force $F_{cw}$ of each sub element. A Bridgman seal utilizes an axial force applied to a plurality of progressively increasing elastic materials disposed against a harder, less elastic surface. As the axial force or pressure increases, the radial force of the elastic material similarly increases.

Therefore, by approximating the cuttings 125 against the tool joint 107 as a Bridgman seal, a relationship between the axial force applied to the cuttings 125 and a radial force $F_{cw}$ can be discovered. The radial force $F_{cw}$ can be obtained from a radial stress $\sigma_{rr}$ for each segment 125a-125n. $\sigma_{rr}$ can be modeled by:

$$\sigma_{rr} = \lambda \varepsilon = \frac{\lambda \sigma_{zz}}{(\lambda + 2G)}$$

wherein $\lambda$ is Lame's first parameter, G is the shear modulus of the cuttings plug, and $\sigma_{zz}$ is the axial stress, which can calculated from axial force $F_r$.

The shear modulus of the cuttings plug G can be calculated by:

$$G = \frac{E}{2(1+v)}$$

wherein, E is the Young's modulus of the cuttings plug and v is the Poisson's Ratio of the cuttings plug.

Results from the axial plug force model 214 can be utilized by the discrete cuttings plug force model 216, which may model the cuttings plug force as previously described.

After determining a total additional force attributed to the accumulated cuttings at the tool joint (axial plug force), the resulting required hook load can be compared to known, historical, or experimental values or limits, including maximums and operating limits in the parameter comparison block 212. In some embodiments, the modeled additional required hook load can be combined with or otherwise used in concert with the torque and drag requirements previously modeled by the torque/drag model 210. For example, a resulting required hook load can be obtained from the equation:

$$\frac{dF_t}{ds} - w_{bp}\cos\varphi - f\sqrt{(F_t k + w_{bp} n_z - \rho A k v_t^2)^2 + (w_{bp} b_z)^2} = \rho A \frac{dv_1}{dt} + F_{ad}$$

wherein $F_t$ is the axial force for the modeled drill string component, $W_{bp}$ is the unit weight of the drill string, $\varphi$ is the inclination angle of the well, $f$ is the friction factor, $V_t$ is the drill string moving velocity, t represents the time, k is the curvature of the wellbore, $n_z$ and $b_z$ are the unit vector of Frenet-Serret coordinate system, p is the density of the drill string, and $F_{ad}$ is the additional force calculated from axial plug force model 214.

In some embodiments, total required torque and hook load can be compared to known, historical, or experimental values or limits, including maximums and operating limits in the parameter comparison block 212.

Figure 6:
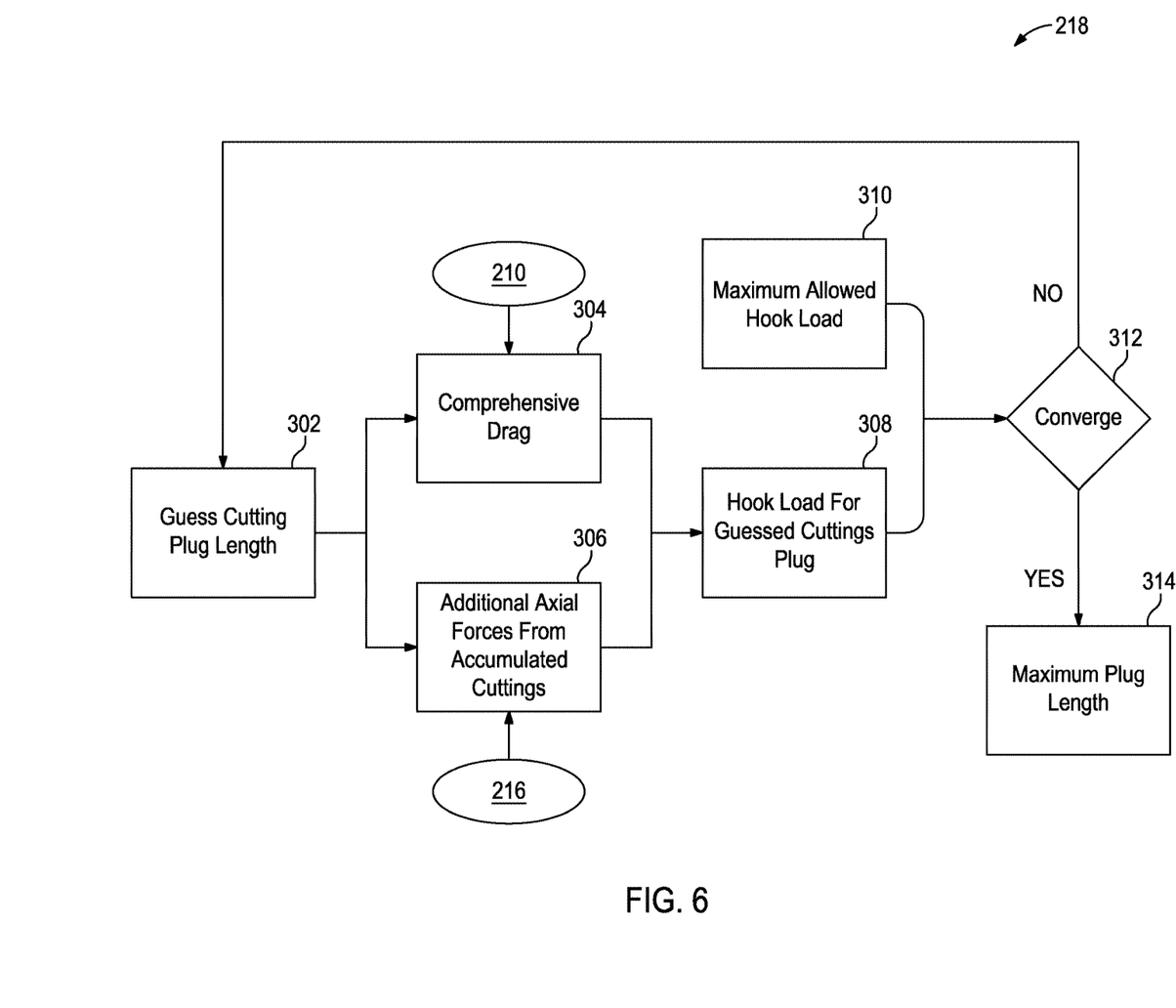
FIG. 6 is a flow chart of a solving model, according to some embodiments of the present disclosure.

In some embodiments, the models described herein can be utilized to solve for a maximum allowable cuttings accumulation. In some embodiments, the length of an accumulation of cuttings in a "plug" can approximate the cuttings plug contact force or accumulation of cuttings generally. FIG. 6 illustrates a method for solving for the maximum allowable plug length while avoiding a stuck pipe condition. By determining a maximum allowable plug length, determinations to identify when intervening actions should be taken can be made. In some embodiments, interventions can include fluid circulation, or other methods to control the distribution of cuttings within the wellbore to prevent stuck pipe conditions.

The plug length solving model 218 utilizes an iterative approach for solving for cuttings plug lengths. In block 302, a cuttings plug length is seeded. In blocks 304 and 306, the models 210 and 216 are executed to determine the hook load created by the simulated cuttings plug length.

In block 308, the calculated hook load is compared to the maximum allowed hook load 310. In block 312, the values are checked to see if the theoretical load is converging with the actual limit. If the values are converging, the maximum plug length is determined in block 314. Otherwise, plug length solving model 218 may repeat until a solution is found. In other embodiments, any other suitable solving method can be utilized.

Historical data 222 can be used to model and/or validate data. In some embodiments, the models described herein can utilize historical data 222 or theoretical data for planning purposes or for analysis of past stuck pipe events. Much like the stuck pipe event prediction analysis 206, the historical database 222 may be located within computer system 136, located within computer system 146, or divided between the computer systems. In some cases, the stuck pipe event analysis may operate solely from real-time drilling parameters, but in other cases, particularly where trends in drilling parameters are indicative of upcoming stuck pipe events, the historical data may be used. Finally, the static data (e.g., hole diameter, drill pipe outer diameter, length of drill string) may also be applied to the historical database 222, and thus likewise is accessible by the stuck pipe event analysis 206.

In some embodiments, during and after modeling described herein, and/or in response to the modeling, operational parameters of components of the drilling operation can be changed or adjusted, manually or automatically, to prevent or remediate a stuck pipe event. In some embodiments, operational parameters of components of the drilling operation can be adjusted in real-time. In some embodiments, the models described herein can be utilized with a drilling simulation. Examples of operational parameters of components of the drilling operation that may be changed based on the stuck pipe analysis may include, but are not limited to, flow rate of the drilling fluid, viscosity of the drilling fluid, density (or weight) of the drilling fluid, lubricity of the drilling fluid, fluid composition (e.g., oil based mud vs water or emulsion muds or additives in the fluid), revolutions per minute of the drill bit, rate of penetration into the subterranean formation, torque applied to the drill string, trajectory of the drill bit (e.g., which may change measured depth and true vertical depth), weight on bit, wellbore pressure (e.g., with managed pressure drilling), and the like, and/or any combination thereof.

In some embodiments, the steps of collecting the real-time data, calculating the torque and hook load, solving for a maximum plug length, optionally inputting theoretical changes, and optionally changing the operational parameters may be operated under computer control, remotely, and/or at the well site. In some embodiments, the computer and associated algorithm for each of the foregoing can produce an output that is readable by an operator who can manually change an operational parameter of components of the drilling operation and/or be used to automatically change an operational parameter of components of the drilling operation.

Various examples of aspects of the disclosure are described below as clauses for convenience. These are provided as examples, and do not limit the subject technology.

Clause 1. A method comprising: receiving a plurality of drilling parameters from a drilling operation, wherein the plurality of drilling parameters includes a cuttings bed height and a friction factor between a drill string and a wellbore; applying the plurality of drilling parameters to a friction model comprising a function of the cuttings bed height to determine a comprehensive friction factor; applying the comprehensive friction factor to the plurality of drilling parameters to determine a required hook load of the drill string; and providing an indication of a stuck pipe event, the indication based on the required hook load.

Clause 2. The method of Clause 1, further comprising adjusting at least one of the plurality of drilling parameters in response to the indication of the stuck pipe event.

Clause 3. The method of Clause 2, wherein the plurality of drilling parameters comprises: a weight-on-bit; a hook load; a rate-of-penetration; a rotary speed of the drill string; a torque applied to the drill string; a drilling fluid pump pressure; an inclination of the drill string; a length of drill string; or a drilling fluid flow rate.

Clause 4. The method of any preceding Clause, wherein the plurality of drilling parameters includes a cuttings plug contact force.

Clause 5. The method of Clause 4, wherein the cuttings plug contact force is based on a plurality of discrete cuttings plug contact forces.

Clause 6. The method of Clause 5, further comprising applying the plurality of discrete cuttings plug contact forces to an approximation model to determine an axial plug force.

Clause 7. The method of Clause 6, further comprising providing the indication of the stuck pipe event, the indication based on the required hook load and the axial plug force.

Clause 8. The method of Clause 4, further comprising identifying a maximum cuttings plug contact force, wherein the required hook load is equal to a maximum hook load of the drill string.

Clause 9. The method of Clause 8, further comprising correlating the maximum cuttings plug contact force to a maximum cuttings plug length.

Clause 10. The method of Clause 9, further comprising solving for the maximum cuttings plug length, wherein the required hook load is equal to the maximum hook load.

Clause 11. The method of any preceding Clause, wherein the plurality of drilling parameters includes a cuttings distribution. Clause 12. A method comprising: receiving a plurality of drilling parameters from a drilling operation, wherein the plurality of drilling parameters includes a cuttings bed height and a friction factor between a drill string and a wellbore; applying the plurality of drilling parameters to a friction model comprising a function of the cuttings bed height to determine a comprehensive friction factor; applying the comprehensive friction factor to the plurality of drilling parameters to determine a required torque of the drill string; and providing an indication of a stuck pipe event, the indication based on the required torque.

Clause 13. The method of Clause 12, further comprising adjusting at least one of the plurality of drilling parameters in response to the indication of the stuck pipe event.

Clause 14. The method of Clause 13, wherein the plurality of drilling parameters comprises: a weight-on-bit; a hook load; a rate-of-penetration; a rotary speed of the drill string; a torque applied to the drill string; a drilling fluid pump pressure; an inclination of the drill string; a length of drill string; or a drilling fluid flow rate.

Clause 15. The method of Clauses 12-14, wherein the cuttings bed height is normalized by a diameter of the wellbore.

Clause 16. The method of Clauses 12-15, further comprising applying the comprehensive friction factor to the plurality of drilling parameters to determine a required hook load of the drill string.

Clause 17. The method of Clause 16, wherein the plurality of drilling parameters includes a cuttings plug contact force.

Clause 18. The method of Clause 17, wherein the cuttings plug contact force is based on a plurality of discrete cuttings plug contact forces.

Clause 19. The method of Clause 18, further comprising applying the plurality of discrete cuttings plug contact forces to an approximation model to determine an axial plug force.

Clause 20. The method of Clause 19, further comprising providing the indication of the stuck pipe event, the indication based on the required hook load and the axial plug force.

Clause 21. The method of Clause 17, further comprising identifying a maximum cuttings plug contact force, wherein the required hook load is equal to a maximum hook load of the drill string.

Clause 22. The method of Clause 21, further comprising correlating the maximum cuttings plug contact force to a maximum cuttings plug length.

Clause 23. The method of Clause 22, further comprising solving for the maximum cuttings plug length, wherein the required hook load is equal to the maximum hook load.

Clause 24. A non-transitory computer-readable medium storing a program that, when executed by a processor, causes the processor to: receive a plurality of drilling parameters from a drilling operation, wherein the plurality of drilling parameters includes a cuttings bed height and a friction factor between a drill string and a wellbore; apply the plurality of drilling parameters to a friction model comprising a function of the cuttings bed height to determine a comprehensive friction factor; apply the comprehensive friction factor to the plurality of drilling parameters to determine a required hook load of the drill string; and provide an indication of a stuck pipe event, the indication based on the required hook load.

Clause 25. The computer-readable medium of Clause 24, wherein, when executed by a processor, the computer-readable medium causes the processor to adjust at least one of the plurality of drilling parameters in response to the indication of the stuck pipe event.

Clause 26. The computer-readable medium of Clause 25, wherein the plurality of drilling parameters comprises: a weight-on-bit; a hook load; a rate-of-penetration; a rotary speed of the drill string; a torque applied to the drill string; a drilling fluid pump pressure; an inclination of the drill string; a length of drill string; or a drilling fluid flow rate.

Clause 27. The computer-readable medium of Clauses 24-26, wherein the plurality of drilling parameters includes a cuttings plug contact force.

Clause 28. The computer-readable medium of Clause 27, wherein the cuttings plug contact force is based on a plurality of discrete cuttings plug contact forces.

Clause 29. The computer-readable medium of Clause 28, wherein, when executed by a processor, the computer-readable medium causes the processor to apply the plurality of discrete cuttings plug contact forces to an approximation model to determine an axial plug force.

Clause 30. The computer-readable medium of Clause 29, wherein, when executed by a processor, the computer-readable medium causes the processor to provide the indication of the stuck pipe event, the indication based on the required hook load and the axial plug force.

Clause 31. The computer-readable medium of Clause 27, wherein, when executed by a processor, the computer-readable medium causes the processor to identify a maximum cuttings plug contact force, wherein the required hook load is equal to a maximum hook load of the drill string.

Clause 32. The computer-readable medium of Clause 31, wherein, when executed by a processor, the computer-readable medium causes the processor to correspond the maximum cuttings plug contact force to a maximum cuttings plug length.

Clause 33. The computer-readable medium of Clause 32, wherein, when executed by a processor, the computer-readable medium causes the processor to solve for the maximum cuttings plug length, wherein the required hook load is equal to the maximum hook load.

Clause 34. The computer-readable medium of Clauses 24-33, wherein, when executed by a processor, the computer-readable medium causes the processor to: apply the comprehensive friction factor to the plurality of drilling parameters to determine a required torque; and provide the indication of the stuck pipe event, the indication based on the required torque.

Clause 35. The computer-readable medium of Clause 34, wherein the cuttings bed height is normalized by a diameter of the wellbore.

Clause 36. The computer-readable medium of Clauses 24-35, wherein, when executed by a processor, the computer-readable medium further causes the processor to apply the comprehensive friction factor to the plurality of drilling parameters to determine a required torque of the drill string.

Clause 37. A method comprising: receiving a plurality of drilling parameters from a drilling operation, wherein the plurality of drilling parameters includes a cuttings plug contact force; identifying a plurality of discrete cuttings plug contact force from the cuttings plug contact force; applying the plurality of discrete cuttings plug contact forces to an approximation model to determine a required hook load; and providing an indication of a stuck pipe event, the indication based on the required hook load.

Clause 38. The method of Clause 37, further comprising adjusting at least one of the plurality of drilling parameters in response to the indication of the stuck pipe event.

Clause 39. The method of Clause 38, wherein the plurality of drilling parameters comprises: a weight-on-bit; a hook load; a rate-of-penetration; a rotary speed of the drill string; a torque applied to the drill string; a drilling fluid pump pressure, an inclination of the drill string; a length of drill string; or a drilling fluid flow rate.

Clause 40. The method of Clauses 37-39, further comprising identifying a maximum cuttings plug contact force, wherein the required hook load is equal to a maximum hook load of the drill string.

Clause 41. The method of Clause 38, further comprising correlating the maximum cuttings plug contact force to a maximum cuttings plug length.

Clause 42. The method of Clause 41, further comprising solving for the maximum cuttings plug length, wherein the required hook load is equal to the maximum hook load.

Clause 43. The method of Clauses 37-42, further comprising applying the comprehensive friction factor to the plurality of drilling parameters to determine the required hook load of the drill string.

Clause 44. The method of Clauses 37-43, further comprising applying the comprehensive friction factor to the plurality of drilling parameters to determine a required torque of the drill string.

Clause 45. A method comprising: receiving a plurality of drilling parameters from a drilling operation, wherein the plurality of drilling parameters includes a cuttings bed height and a friction factor between a drill string and a wellbore; applying the plurality of drilling parameters to a friction model comprising a function of the cuttings bed height to determine a comprehensive friction factor; and providing an indication of a stuck pipe event, the indication based on the required hook load.

Clause 46. The method of Clause 45, further comprising adjusting at least one of the plurality of drilling parameters in response to the indication of the stuck pipe event.

Clause 47. The method of Clause 46, wherein the plurality of drilling parameters comprises: a weight-on-bit; a hook load; a rate-of-penetration, a rotary speed of the drill string; a torque applied to the drill string; a drilling fluid pump pressure; an inclination of the drill string; a length of drill string; or a drilling fluid flow rate.

Clause 48. The method of Clauses 45-47, further comprising applying the comprehensive friction factor to the plurality of drilling parameters to determine the required hook load of the drill string.

Clause 49. The method of Clauses 45-48, wherein the plurality of drilling parameters includes a cuttings plug contact force.

Clause 50. The method of Clause 49, wherein the cuttings plug contact force is based on a plurality of discrete cuttings plug contact forces.

Clause 51. The method of Clause 50 further comprising applying the plurality of discrete cuttings plug contact forces to an approximation model to determine an axial plug force.

Clause 52. The method of Clause 51, further comprising providing the indication of the stuck pipe event, the indication based on the required hook load and the axial plug force.

Clause 53. The method of Clause 52, further comprising identifying a maximum cuttings plug contact force, wherein the required hook load is equal to a maximum hook load of the drill string.

Clause 54. The method of Clause 53, further comprising correlating the maximum cuttings plug contact force to a maximum cuttings plug length.

Clause 55. The method of Clause 53, further comprising solving for the maximum cuttings plug length, wherein the required hook load is equal to the maximum hook load.

Clause 56. The method of Clauses 45-55, further comprising applying the comprehensive friction factor to the plurality of drilling parameters to determine a required torque of the drill string.

What is claimed is:

1. A method comprising:
receiving a plurality of drilling parameters from a drilling operation, wherein the plurality of drilling parameters includes a cuttings bed height and a friction factor between a drill string and a wellbore;
simulating an estimated cuttings bed length, wherein simulating the estimated cuttings bed length includes:
generating a seed for the estimated cuttings bed length;
applying the plurality of drilling parameters and the seed for the estimated cuttings bed length to a friction model comprising a function of the cuttings bed height to determine a comprehensive friction factor;
applying the comprehensive friction factor to the plurality of drilling; parameters to determine a required hook load of the drill string;
comparing the required hook load to a maximum allowable hook load;
comparing the required hook load to known, historical or experimental values; and
updating the seed for the estimated cuttings bed length in response to determining that the required hook load and the known, historical or experimental values do not converge; and
repeating the applying the plurality of drilling parameters and the seed for the estimated cuttings bed length, applying the comprehensive friction factor, comparing the required hook load to known, historical or experimental values and updating the seed until a convergence between the required hook load, the known, historical or experimental values and the maximum allowed hook load is detected;
providing an indication of a stuck pipe event, the indication based on the convergence of the required hook load, the known, historical or experimental values and the maximum allowed hook load; and
adjusting at least one of the plurality of drilling parameters in response to the indication of the stuck pipe event.

2. The method of claim 1, wherein the plurality of drilling parameters includes a cuttings distribution.

3. The method of claim 1, wherein the plurality of drilling parameters comprises:
a weight-on-bit; a hook load; a rate-of-penetration; a rotary speed of the drill string; a torque applied to the drill string; a drilling fluid pump pressure; an inclination of the drill string a length of drill string; or a drilling fluid flow rate.

4. The method of claim 1, wherein the plurality of drilling parameters includes a cuttings plug contact force.

5. The method of claim 4, wherein the cuttings plug contact force is based on a plurality of discrete cuttings plug contact forces.

6. The method of claim 5, further comprising applying the plurality of discrete cuttings plug contact forces to an approximation model to determine an axial plug force.

7. The method of claim 6, further comprising providing the indication of the stuck pipe event, the indication based on the required hook load and the axial plug force.

8. The method of claim 5, further comprising identifying a maximum cuttings plug contact force, wherein the required hook load is equal to a maximum hook load of the drill string.

9. The method of claim 8, further comprising correlating the maximum cuttings plug contact force to a maximum cuttings plug length.

10. The method of claim 9, further comprising solving for the maximum cuttings plug length, wherein the required hook load is equal to the maximum hook load.

11. A method comprising:
receiving a plurality of drilling parameters from a drilling operation, wherein the plurality of drilling parameters includes a cuttings bed height and a friction factor between a drill string and a wellbore;
simulating an estimated cuttings bed length, wherein simulating the estimated cuttings bed length includes:
generating a seed for the estimated cuttings bed length;
applying the plurality of drilling parameters and the seed for the estimated cuttings bed length to a friction model comprising a function of the cuttings bed height to determine a comprehensive friction factor;
applying the comprehensive friction factor to the plurality of drilling parameters to determine a required torque of the drill string;
comparing the required torque to a maximum allowed torque;
comparing the required torque to known, historical or experimental values; and
updating the seed for the estimated cuttings bed length based in response to determining that the required torque and the known, historical or experimental values do not converge; and
repeating the applying the plurality of drilling parameters and the seed for the estimated cuttings bed length, applying the comprehensive friction factor, comparing the required torque to known, historical or experimental values and updating the seed until a convergence between the required torque the known, historical or experimental values and the maximum allowed torque is detected;
providing an indication of a stuck pipe event, the indication based on the convergence of the required torque, the known, historical or experimental values the maximum allowed torque; and
adjusting at least one of the plurality of drilling parameters in response to the indication of the stuck pipe event.

12. The method of claim 11, wherein the cuttings bed height is normalized by a diameter of the wellbore.

13. The method of claim 11, wherein the plurality of drilling parameters comprises:
a weight-on-bit; a hook load; a rate-of-penetration; a rotary speed of the drill string; a torque applied to the drill string; a drilling fluid pump pressure; an inclination of the drill string a length of drill string; or a drilling fluid flow rate.

14. The method of claim 11, wherein the plurality of drilling parameters includes a cuttings plug contact force.

15. The method of claim 14, wherein the cuttings plug contact force is based on a plurality of discrete cuttings plug contact forces.

16. A non-transitory computer-readable medium storing a program that, when executed by a processor, causes the processor to:

receive a plurality of drilling parameters from a drilling operation, wherein the plurality of drilling parameters includes a cuttings bed height and a friction factor between a drill string and a wellbore;
simulate an estimated cuttings bed length, wherein the estimated cuttings bed length is simulated by:
generating a seed for the estimated cuttings bed length;
applying the plurality of drilling parameters and the seed for the estimated cuttings bed length to a friction model comprising a function of the cuttings bed height to determine a comprehensive friction factor;
applying the comprehensive friction factor to the plurality of drilling parameters to determine a required hook load of the drill string;
comparing the required hook load to a maximum allowed hook load;
comparing the required hook load to known, historical or experimental values; and
updating the seed for the estimated cuttings bed length in response to determining that the required hook load and the known, historical or experimental values do not converge; and
repeating the applying the plurality of drilling parameters and the seed for the estimated cuttings bed length, applying the comprehensive friction factor, comparing the required hook load to known, historical or experimental values and updating the seed until a convergence between the required hook load, the known, historical or experimental values and the maximum allowed hook load is detected;
provide an indication of a stuck pipe event, the indication based on the convergence of the required hook load, the known, historical or experimental value and the maximum allowed hook load; and
wherein, when executed by a processor, the computer-readable medium causes the processor to adjust at least one of the plurality of drilling parameters in response to the indication of the stuck pipe event.

17. The computer-readable medium of claim 16, wherein the plurality of drilling parameters includes a cuttings plug contact force.

18. The computer-readable medium of claim 17, wherein the cuttings plug contact force is based on a plurality of discrete cuttings plug contact forces.

19. The computer-readable medium of claim 18, wherein, when executed by a processor, the computer-readable medium causes the processor to apply the plurality of discrete cuttings plug contact forces to an approximation model to determine an axial plug force.

20. The computer-readable medium of claim 19, wherein, when executed by a processor, the computer-readable medium causes the processor to provide the indication of the stuck pipe event, the indication based on the required hook load and the axial plug force.

* * * * *